June 28, 1938.  C. C. JACOBSON  2,121,966
PROCESS OF MOLDING SYNTHETIC RESINS AND LIKE PLASTIC MATERIALS
Filed Nov. 12, 1934  2 Sheets-Sheet 1
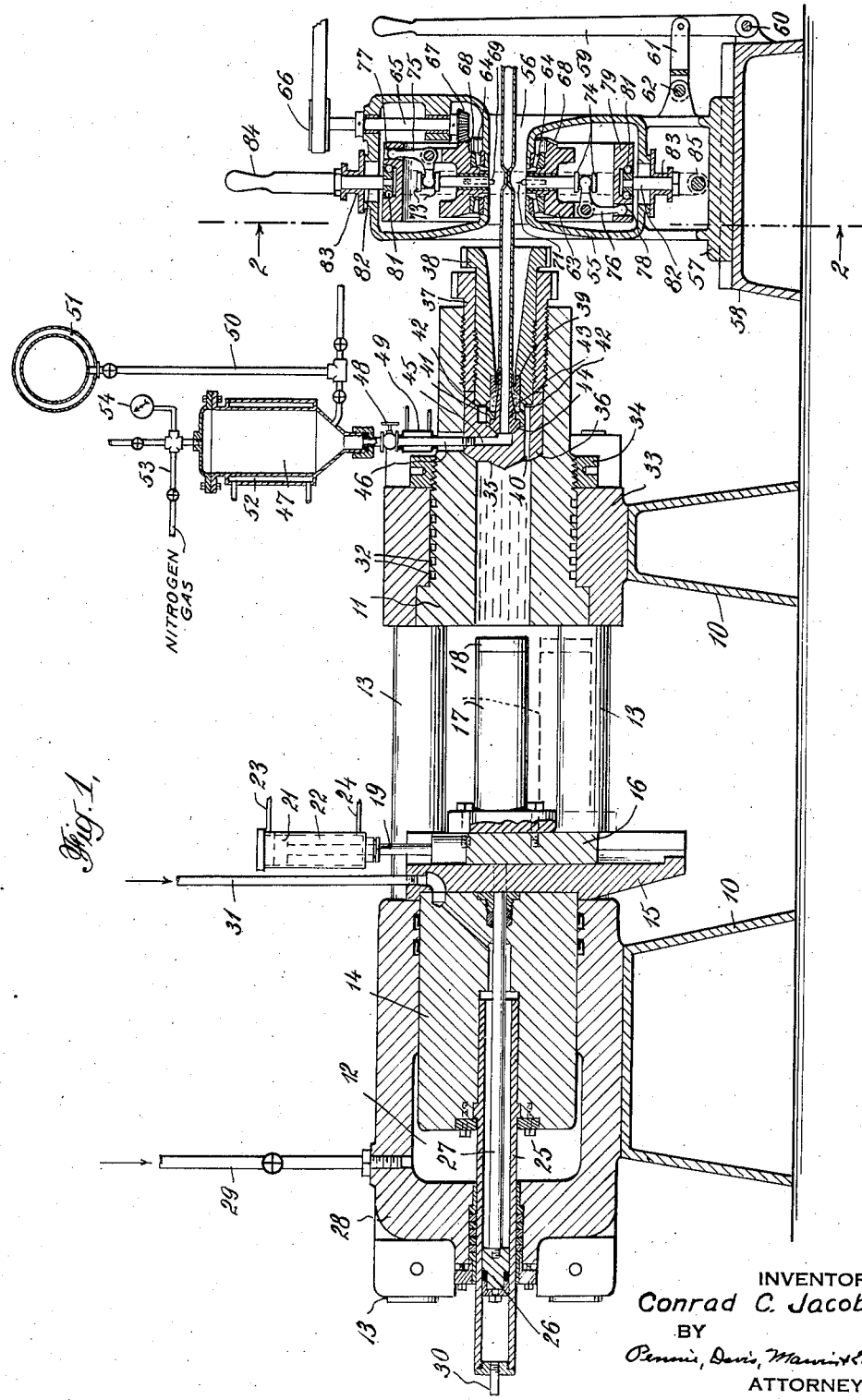
INVENTOR
Conrad C. Jacobson
BY
ATTORNEYS

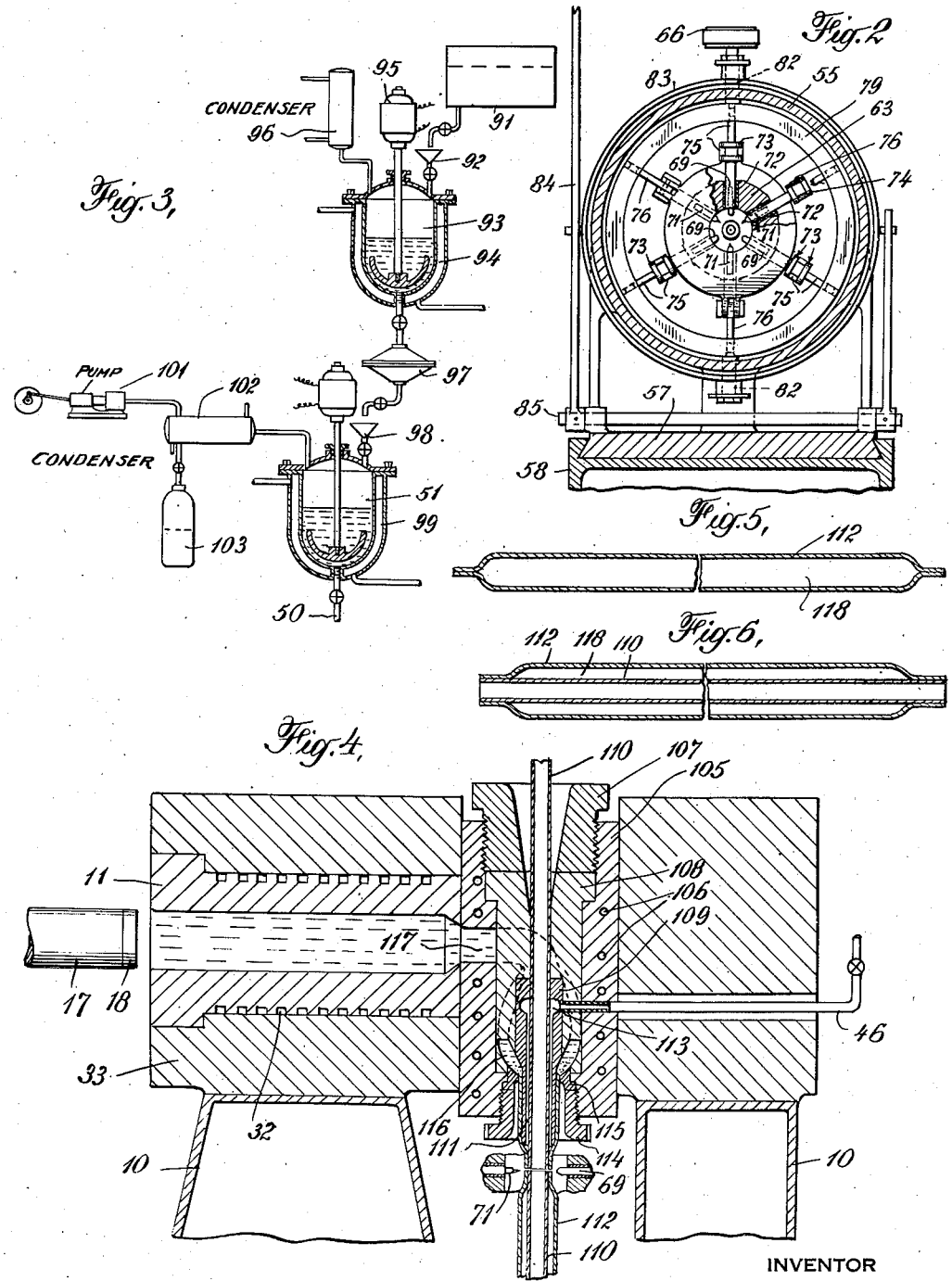

Patented June 28, 1938

2,121,966

UNITED STATES PATENT OFFICE 2,121,966

PROCESS OF MOLDING SYNTHETIC RESINS AND LIKE PLASTIC MATERIALS

Conrad C. Jacobson, Glen Ridge, N. J., assignor to John Robertson Company, Incorporated, Brooklyn, N. Y., a corporation of New York Application November 12, 1934, Serial No. 752,562

27 Claims. (Cl. 18—55)

This invention relates generally to the art of molding synthetic resins and like plastic materials, for example, phenol-formaldehyde condensation products, and has particular reference to the molding of rods and tubes of such materials directly to the desired shape and length. The invention contemplates the provision of an improved process whereby such articles may be preformed by an extrusion method, and ultimately obtained in solid condition in any desired lengths and in any desired exterior surface conformation.

In the heretofore customary method of producing rods of plastic materials, such as phenol-formaldehyde condensation products, the plastic is poured into lead molds prepared in the desired shape. Such molds are formed by dipping a steel master-mold into a bath of molten lead. The lead congeals on the master-mold thus forming, when cool, and after the master is removed therefrom, a mold of similar but complementary shape into which the plastic resin may be poured. The resin is evaporated until it has the highest viscosity which will still permit ready pouring, and then is poured into the molds, which have been preheated to the proper temperature. The filled molds are then placed in a curing chamber where they are heated to the proper curing temperature and allowed to remain for a period of time, from two to ten days. In the case of phenol-formaldehyde condensation products, this curing changes the material from its previous relatively plastic and pourable state to the solid state. After the curing is completed, the molds are taken out of the chamber and the solidified product removed from the molds, usually by the employment of an air-operated punch. The molds are then remelted and the lead used over again.

The above described procedure has several inherent disadvantages. It has been found that it is extremely difficult, if not impossible in practice, to cast lead molds of more than about twenty inches in length, and that even for these lengths considerable taper tolerances must be provided. This is due to the fact that in order to be able to remove the steel master from the lead mold the master must be tapered, a taper of 0.015 inch in a twenty inch length being about the least taper possible to successfully employ, and even then it has proved practically impossible to remove the master from a mold of more than about twenty inches in length without breaking the mold. Then, after being cast, the molds exposed to the atmosphere have the tendency to become oxidized and coated with dirt and dust, thus discoloring and contaminating the surface of the molded material. Considerable air is trapped in the mold when the resin is poured in, thus affecting the quality of the ultimate product, and considerable resin is usually wasted during the pouring operation. Then too, breakage occurs in removing the solidified rods from the molds, and when the molds are remelted considerable loss of lead, due to oxidation, occurs.

Hollow tubes have been produced in a manner similar to that described above, and similar limitations as regards taper and length obtain. Generally both the inside and the outside of the tube will have to be tapered.

In order to overcome the above-outlined disadvantages inherent in the present methods of molding synthetic resins and like plastic materials, I have devised a new process for molding rods and tubes and the like of these materials which when practiced results in a superior product with a considerable saving of expense.

In accordance with the invention a hollow tubular sheath of a substantially solid material, preferably a metal such as lead, is extruded by means of suitable apparatus hereinafter described. Into this sheath the plastic material is extruded, preferably simultaneously therewith, thereby filling the sheath and utilizing its inner surface as a mold. The sheath may be constricted at suitable points along its length, determined by the length of the desired product, a rod for example, and the sheath severed at these points. Thus by sealing the end of the sheath as it is being extruded the plastic material is prevented from leaking out of the next succeeding section.

The severed sections of the preformed plastic-filled sheath may then be placed on suitable rack supports and placed in a chamber where they may be left for an appropriate length of time at the proper curing temperature. When the curing is completed the lead sheath may be easily removed by a stripping operation. This may be done by appropriate machinery so as to strip off the sheath with no injury whatever to the surface of the solidified rod within it, and without danger of breakage. It has been found that the surface of rods made by this process is very smooth, in some cases having the appearance of having been polished.

It is of course possible, for some plastics, to continuously cure the material as it emerges from the extruding machine, by passing the plastic-filled sheath continuously through a suitable curing chamber and subsequently removing the sheath, instead of cutting the sheath into lengths prior to the curing operation. This will be determined, among other considerations, by the length of time and the type of treatment required for curing the particular plastic being molded. In some instances immersing the plastic-filled sheath in hot water, hot oil, etc., will hasten the curing operation since it provides more intimate contact than is possible with hot gases. Also, it is possible to reel the plastic-filled sheath onto drums in five hundred or a thousand foot lengths and cure the plastic while wound thereon, after which the sheath may be removed and the solidified plastic cut into appropriate lengths. When, however, the plastic-filled sheath is cut into lengths for curing, it is advisable to jar the sections as little as possible before curing, in order to avoid defects in the ultimate product. Also it is sometimes advisable to stand the sections on end, when curing, in order to permit any air which might possibly be present therein to rise to the top and thus not affect the finished product.

When making hollow or tubular lengths of plastic material, the process is carried out in a similar manner. In this case, however, a core must be provided, the core preferably being a tube or rod of substantially solid material of appropriate shape and having a melting point sufficiently low so that it can be melted out of the cured tube without injury thereto. Preferably this core would also be extruded, but previous to the molding operation. The outer sheath for the hollow tube is extruded around the core but spaced therefrom, thus leaving an annular space into which the plastic material may be forced and simultaneously extruded. The sheath is sealed to the core at a point along the length thereof, by constricting the sheath, or otherwise, and the plastic is then extruded into the sealed space, preferably being extruded simultaneously with the extrusion of the sheath. After a desired length has been extruded the sheath may again be sealed to the core, the extruded section severed, and another section extruded, etc. The plastic-filled sections may be removed to a curing chamber and after curing the sheath stripped off and the core melted out (by the use of hot water, or some other suitable treatment).

By the use of my process rods and tubes of any desired length and exterior surface conformation may be produced, and the cross-sections thereof will be substantially uniform throughout. Also, since the sheath is filled with the plastic material as it is substantially simultaneously extruded, no dirt or other contaminating materials can enter and the lead can not become oxidized, thereby preventing discoloration of the surface of the molded plastic. Likewise, the reduction in the total quantity of lead required for a given production of molded material, which reduces the total amount of lead lost due to oxidation during the remelting, the elimination of the old hand-molded lead molds, the ease with which the sheath is removed from the rods without breakage, and the elimination of hand-pouring, loss of resin, etc. effect very substantial savings in the course of production.

In addition, the product is improved due to the fact that when the extruded end of the sheath is completely or partially closed by constriction, and the end becomes filled with plastic material, thereby forcing out the air contained therein, no further air can enter the portion of the sheath into which the plastic is being extruded, thus preventing the entrapment of air in the finished product. Also, since as much pressure may be applied to the plastic material as is found desirable or necessary to fill the extruded mold, the plastic may have a higher initial viscosity than it is possible to employ in the usual pouring operation, and therefore the plastic material may be of much higher viscosity than that capable of being utilized in prior operations. Thus plastics heretofore found impracticable or difficult to mold may be successfully used. An additional advantage is that since the sheath is constricted and severed while the plastic is being forced into the next succeeding section, the plastic in the section to be severed may be placed under as much pressure as desired, and the sheath constricted and sealed while the plastic is under that pressure.

It will be understood from the foregoing that it is not necessary to use lead for the sheathing material, but that other materials, metallic or otherwise, possessing sufficient solidity to serve as a mold for the plastic during the extrusion and curing operations may be employed. In some cases it may be desirable to choose the sheathing material according to the requirements of the subsequent curing operations; and for small diameter rods a low melting alloy may be used. The cores for the tubing may also be chosen to suit the circumstances.

Likewise it will be understood that plastics other than phenol-formaldehyde condensation products may be molded by this method, for example, the urea resins and other synthetic resins, as long as the substance is sufficiently plastic to be extruded and may be subsequently cured so as to become sufficiently solid to withstand undesired deformation when the sheath is removed. Also, finely divided materials may be extruded and molded by this process, the term "plastic" being broadly used to include any material which may be molded. The term "curing" is intended to include not only the solidification of plastics by heat treatment, but also the setting due to chemical reaction, ageing, etc.

The following description of apparatus suitable for carrying out my process and of the application of the process to the production of rods and tubes of a phenol-formaldehyde condensation product, is for the purpose of more clearly disclosing and illustrating my invention, and is not intended to limit its scope to the specific embodiment hereinafter described.

In the drawings,

Figure 1 is a section taken on the vertical plane of symmetry of the machine, showing the apparatus used for molding rods of plastic material and the spinner used for sealing and severing the plastic-filled sheath;

Figure 2 is a section of the spinner taken on line 2—2 of Figure 1;

Figure 3 is a diagram showing apparatus for producing a phenol-formaldehyde resin;

Figure 4 is a detail in section, showing a modification of the apparatus of Figure 1 for producing hollow tubes of plastic material; and Figures 5 and 6 are details showing severed sections of plastic-filled sheath for producing a molded rod and tube, respectively.

Referring now to Figure 1, framework 10 supports the extrusion cylinder block 11 and the main hydraulic cylinder 12, which are rigidly connected by columns 13. Hydraulic ram 14 slides within cylinder 12 and carries on its outer face the framework 15 in which is slidably mounted the slider 16. Rigidly mounted on slider 16 is the extrusion ram 17, which is adapted to slide within the extrusion cylinder block 11. The extrusion ram 17 is faced with suitable material such as Monel metal, 18. Slider 16 is connected by rod 19 to the piston 21 which slides within cylinder 22. Cylinder 22 is provided with connections 23 and 24, for admitting compressed air into the cylinder on either side of piston 21.

Firmly secured to hydraulic ram 14 is the cylindrical tube 25, within which slides the charging piston 26, and charging rod 27. Tube 25 is adapted to slide within the cylinder head 28. Water under suitable pressure may be admitted to the main hydraulic cylinder 12 through pipe 29, and compressed air under suitable pressure to either side of charging piston 26 through connections 30 and 31.

The extrusion cylinder block 11 is provided with conduits 32 through which hot water, hot oil or steam may be circulated to keep the material to be extruded at the proper temperature, and is retained within the supporting block 33 by means of the threaded nut 34. Positioned within the cylinder block 11 is the plug 35, which is held securely against its seat 36 by the threaded sleeve 37. The plug contains a number of passages 40 which permit the flow of the extruding material therearound. Sleeve 37 is threaded both inside and outside and has mounted therein the die nut 38, which carries the inserted die 39. The die nut 38 also carries the shoulder 41, which is secured to the die nut by means of legs 42. Shoulder 41 presses the die core 43 firmly against its seat 44, thereby retaining it on its proper position. By this construction both die core and die can be removed by removing die nut 38, thus facilitating the changing of dies and die cores for different size or shape rods.

Die core 43 is hollow and communicates with a channel 45 in plug 35. Conduit 46 screws into channel 45 and leads to container 47, which holds the plastic material to be extruded. Conduit 46 is provided with a valve 48 and a heating jacket 49 which maintains the plastic material at the correct temperature as it flows through the conduit. Plastic material is introduced into container 47 through pipe 50 which communicates with the evaporating retort 51. Container 47 is provided with a heating jacket 52 for keeping the plastic material at the proper temperature. In order to apply the proper pressure for extruding the plastic material a cylinder of nitrogen or other suitable gas under pressure (not shown) is connected to pipe 53, which communicates with the top of container 47. A pressure gauge 54 is also provided to guide the operator in controlling the extrusion of the plastic into the sheath as it is extruded.

As the plastic-filled sheath emerges from the mouth of die nut 38 it passes through apparatus for sealing and severing the sheath, called, for convenience, the spinner. The spinner (shown in Figures 1 and 2) comprises an outer shell 55 having a central opening 56 through which the extruded sheath may pass. Shell 55 is mounted on base 57 and is adapted to slide horizontally on support 58. The horizontal movement, which is for the purpose of enabling the operator to properly seal and sever the sheath at the desired point, is controlled by lever handle 59. This lever is pivoted at 60 and acts through the link 61, which is pivoted to the shell 55 at 62.

Within the shell 55 is the rotor 63, which is mounted on conical bearings 64 so as to rotate about the central opening 56 as an axis. The rotation is produced by the shaft 65 which is belted by means of pulley 66 to a suitable source of power and is provided at the other end with a bevel gear 67 engaging gear ring 68 on rotor 63. The rotor is provided with three spinners 69 and three cutters 71, equally spaced around the rotor as shown in Figure 2. These spinners and cutters slide in journals 72 and are operated by means hereinafter described so that the spinners may be forced inwards to engage the sheath and constrict it, and then the spinners withdrawn and the cutters forced inwards to sever the constricted portion.

The spinners and cutters are provided with collars 73 and 74 which are engaged by bell cranks 75 and 76, respectively, the bell cranks being pivoted on rotor 63. The other ends of the bell cranks slide in grooves 77 and 78, respectively, provided in the annular ring 79. Ring 79 is mounted on bearings 81 so that it can rotate about opening 56 as an axis. Bearings 81 are supported on studs 82 rigidly mounted inside the annular ring 83, the latter encircling shell 55 and adapted to move axially thereon. This axial movement is controlled by means of lever 84 (Figure 2) pivoted at 85 to the base 57 of shell 55.

In operating the spinner the apparatus is first placed at the desired axial position by means of lever 59 and power applied to pulley 66. Then lever 84 is moved to the left (Figure 1) carrying with it annular rings 83 and 79. The motion of annular ring 79 turns the bell cranks 75 and 76 about their pivots so as to push out the spinners 69 and withdraw the cutters 71, as will be understood by reference to Figure 1. When the sheath has been sufficiently sealed the lever 84 is moved to the right, carrying with it annular rings 83 and 79 and thereby causing the bell cranks to withdraw the spinners 69 and force out the cutters 71. It will be understood that since the spinners and cutters are carried around the sheath by the motion of rotor 63, the sheath may be sealed and severed very conveniently and expeditiously. The speed of rotation may be about 300 R. P. M., or varied to suit the circumstances. When the severing is completed the spinners and cutters are placed in the neutral position shown in Figure 1.

Figure 3 shows the procedure followed in making the phenol-formaldehyde resin. A mixture having the desired proportions is made in tank 91 which is placed on a scale (not shown). The following proportions have been found suitable for certain purposes:

| | Parts by weight |
|---|---|
| Phenol | 100 |
| Formalin (37.5% formaldehyde) | 240 |
| Potassium hydroxide (two normal) | 2½ |

These proportions may be widely varied according to the properties desired in the finished product, and the constituents used may be changed to give other suitable plastics.

The mixture is then permitted to flow through funnel 92 into the reflux chamber 93. In this chamber the mixture is heated to the desired temperature (98–99 degrees centigrade) by passing hot water through the jacket 94, and is agitated by means of motor 95. As the vapors are given off they are recondensed by condenser 96, through which cold water is passed. After heating and refluxing for about 45 minutes, 6 parts of phthalic acid in alcohol solution are added and thoroughly mixed, and the material is then passed through cloth filter 97 and funnel 98 into the evaporating retort 51. This retort is heated to a temperature of approximately 80 degrees centigrade by means of hot water in jacket 99, and a vacuum is maintained in the retort by vacuum pump 101. As the vapors are driven off they are condensed in condenser 102 and the condensate passed into trap 103, where the condensate may be measured to maintain proper control of the evaporation. After evaporating the resin to the desired viscosity, which in general will be greater than is possible to use when the molds are poured as in the heretofore customary manner, it is flowed through pipe 50 into the container 47 (as shown in Figure 1). If required, due to the viscosity of the plastic, gas pressure may be applied in retort 51 to force the plastic through pipe 50. It will, of course, be understood that the apparatus may be modified according to the requirements of the particular plastic being made.

In Figure 4 a modification of the die chamber is shown which is adapted to the production of molded hollow tubes. Die block 105 is provided with conduits 106 through which heating fluid may circulate, and is threaded to receive nut 107 which holds the core sleeve 108 securely in place. The die core 109 is secured to the core sleeve and is made hollow so that core 110 may slide therethrough. This core is preferably an extruded tube of a low melting alloy such as a bismuth-cadmium-tin alloy. The upper part of die core 109 and the core sleeve 108 fits snugly around core 110, and if necessary may be provided with soft packing to prevent the plastic from leaking around the core. The lower portion of the die core 109 is enlarged to provide a channel 111 through which the plastic may be forced into the annular space between the core 110 and the extruded sheath 112. Plastic is admitted to channel 111 through the annular enlargement thereof, 113, and conduit 46. Die block 105 is also threaded at its lower end to receive die nut 114 which holds die 115 securely in position. The extrusion cylinder 11 communicates to the extrusion chamber 116 through the passage 117.

The product produced by the use of the apparatus of Figure 1 is shown in Figure 5 and comprises an outer protecting tubular mold or sheath 112 filled with plastic material 118. Figure 6 shows the product produced by the modification shown in Figure 4, and comprises an inner core 110 surrounded by plastic material 118 and an outer protecting sheath 112. The ends of the tubes are shown as sealed by means of the spinner (Figure 2).

The operation of the apparatus when used for molding rods will now be described. Air is admitted to the top of cylinder 22 (Figure 1) and the extrusion ram 17 lowered to the position shown in dotted lines. A slug of lead, preferably pressure cast, is then held in position in front of cylinder 11 by a suitable loading chute (not shown). Air is admitted through connection 30 into tube 25, thereby forcing piston 26 and charging rod 27 forward. The charging rod 27 engages the lead slug in the loading chute and pushes it into extrusion cylinder 11. Thereupon air is admitted to the opposite side of piston 26 through connection 31 and the rod withdrawn, after which the extrusion ram 17 is returned to its original position, shown in full lines. The machine is then ready for the extrusion.

Water under considerable pressure is admitted to cylinder 12 and forces hydraulic ram 14 and extrusion ram 17 forward. The latter ram engages the lead slug and forces the lead to flow through the passages 40 in plug 35, and through the annular space between the die 39 and die core 43. The lead emerges from the dies in the form of a tube of uniform cross-section, and of size, thickness and shape depending on the dies employed. The thickness will usually vary from one-thirty second of an inch to one-eighth of an inch, depending on the diameter of the sheath. The temperature of the lead is preferably kept at about 90 degrees centigrade, although it may be varied according to the circumstances.

As the tubular sheath issues from the mouth of die nut 38 the spinner is operated to constrict and seal the sheath at a point along the length thereof. Then valve 47 is opened and the plastic material is extruded through the central portion of die core 43 by pressure exerted thereon from the nitrogen cylinder. It is desirable to only partially constrict the first joint of the sheath so as to allow the air to escape as the plastic is forced in. As soon as the plastic spurts through the end it may be tightly sealed. In this manner no air is entrapped in the sheath and subsequent joints may be sealed tightly to prevent further air from entering. The plastic is kept at the proper temperature, about 70 degrees centigrade for the plastic above-described, by the heating jackets 52 and 49. The pressure applied may vary from 5 to 50 lbs., according to the various conditions of extruding, although greater pressures are possible, if necessary. The plastic fills the sheath, and the extrusion of both sheath and plastic continue substantially simultaneously. The spinner is operated periodically to seal and cut off portions of the plastic-filled sheath, which are then placed on suitable rack supports in the curing chamber. It is obvious that after the first section of the plastic-filled sheath has been extruded no air can get into the sheath to oxidize it, or form bubbles. Likewise the pressure applied to the plastic will cause a uniform, homogeneous product to be formed.

Although it is preferred to continuously extrude both sheath and plastic it is apparent that a section of sheath could be extruded, the ram 17 stopped, and the plastic then extruded into the sheath. After sealing, the next section of sheath could be extruded and then filled, etc. The sheath need not necessarily be a circular tube, for by properly forming the dies, tubes of any shape cross-section could be extruded, thus making it possible to mold the plastic material in any desired exterior surface configuration.

In making hollow tubes (Figure 4) the operation is begun by extruding a short length of sheath and spinning it fast to the core 110 as shown, allowing entrapped air to escape as above mentioned. Then the plastic is extruded into the space between the core 110 and sheath 112 and the extrusion of sheath and of plastic proceed substantially simultaneously, the sheath being sealed to the core at desired intervals and the portions severed, or, if tubes 110 are cut to the desired length, the sheath is spun to core at the opposite ends thereof. It is of course possible in this case, also, to alternately extrude sheath and then the plastic. Also, by appropriately shaping the dies, and core 110, tubes of any desired cross-sectional shape may be produced.

It is not necessary to employ a spinner of the type shown, to seal and sever the sections of sheath, for the operation can be performed manually, if desired, by using a suitable pair of crimpers. When rods and tubes of any considerable length are produced it is necessary to provide a trough to receive the sheath as it issues from the apparatus, in order to prevent the sheath from sagging, thereby causing deformation of the plastic being molded. In the case of hollow tubes, vertical extrusion downwards is preferable to prevent the inside core from sagging.

After the plastic within the sheath has been cured to the desired extent, the sheath may be removed by cutting or sawing the sheath axially, and stripping it from the cured material, either manually or by using an appropriate machine. If a low melting alloy has been used, this may be removed by immersing in hot water, etc.

When the slug of lead has been completely extruded, the hydraulic ram 14 is returned to its initial position by means of two smaller hydraulic backing rams (not shown) mounted on either side of the main hydraulic ram.

It will now be evident that I have provided a new process for molding rods and tubes of plastic material, by the use of which any desired length of rod or tubing is obtainable, with a uniform, non-tapering cross-section, and that the process results in greater economy of operation than has heretofore been possible, and also produces an improved product.

I claim:

1. The process of molding plastic material which is non-form-retaining but which is capable of being rendered form-retaining by a curing operation which comprises extruding a tubular sheath-mold of substantially solid material, substantially simultaneously extruding the plastic material into the extruded sheath-mold, thereby filling the sheath-mold with plastic material as it is extruded, curing the plastic material within the sheath-mold to a substantially form-retaining state, and subsequently stripping substantially the whole of the sheath-mold from the cured material to obtain a form-retaining rod of the cured plastic.

2. The process of molding plastic material which is non-form-retaining but which is capable of being rendered form-retaining by a curing operation which comprises extruding a tubular metallic sheath, substantially simultaneously extruding the plastic material into the sheath, whereby the sheath is filled with plastic material as it is extruded, curing the plastic material within the sheath, and subsequently stripping substantially the whole of the sheath from the cured material to obtain a form-retaining rod of the cured plastic.

3. The process of molding plastic material which is non-form-retaining but which is capable of being rendered form-retaining by a curing operation which comprises extruding a sheath-mold of substantially solid material, substantially simultaneously extruding the plastic material into the sheath-mold, thereby filling the sheath-mold with plastic material as it is extruded, sealing and severing sections of the plastic-filled sheath-mold, curing the plastic material in the sections to a substantially form-retaining state, and subsequently stripping substantially the whole of the sheath-mold from the cured material to obtain a form-retaining rod of the cured plastic.

4. The process of molding plastic material which is non-form-retaining but which is capable of being rendered form-retaining by a curing operation which comprises extruding a sheath of substantially solid material, sealing the extruded sheath at a point along the length thereof, extruding the plastic material into the sealed portion of the sheath, thereby filling the sheath with plastic material, severing and sealing the plastic-filled sheath and curing the plastic therein contained, and subsequently stripping substantially the whole of the sheath from the cured material to obtain a form-retaining rod of the cured plastic.

5. The process of molding plastic material which is non-form-retaining but which is capable of being rendered form-retaining by a curing operation which comprises extruding a tubular metallic sheath-mold, substantially simultaneously extruding the plastic material into the extruded sheath-mold, thereby filling the sheath-mold with plastic material as it is extruded, tightly constricting the sheath-mold at spaced points along its length to form a seal for the next succeeding section, severing and sealing the sheath-mold at the constricted points to obtain sealed lengths of plastic-filled sheath-mold, subjecting the plastic material in the severed portions to a curing operation, and subsequently stripping substantially the whole of the sheath-mold from the cured material to obtain a form-retaining rod of the cured plastic.

6. The process of molding hollow tubes of plastic material which is non-form-retaining but which is capable of being rendered form-retaining by a curing operation which comprises extruding a tubular sheath of substantially solid material around a core of substantially solid material but spaced therefrom, sealing the extruded sheath to the core at a point along the length thereof, and extruding the plastic material into the sealed space between the core and the sheath, curing the plastic material and subsequently removing substantially the whole of the sheath and the core to form a form-retaining hollow tube.

7. The process of molding hollow tubes of plastic material which is non-form-retaining but which is capable of being rendered form-retaining by a curing operation which comprises extruding a tubular sheath of substantially solid material around a core of substantially solid material but spaced therefrom, sealing the extruded sheath to the core at a point along the length thereof, extruding the plastic material into the sealed space between the core and the sheath substantially simultaneously with the extrusion of the sheath, curing the plastic material to a form-retaining state and subsequently removing substantially the whole of the sheath and the core.

8. The process of molding hollow tubes of plastic material which is non-form-retaining but which is capable of being rendered form-retaining by a curing operation which comprises extruding a tubular sheath of substantially solid material around a core of substantially solid material but spaced therefrom, substantially simultaneously extruding the plastic material into the space between the tubular sheath and the core, curing the plastic material, and subsequently removing substantially the whole of the sheath and core to obtain a form-retaining hollow tube of the cured plastic.

9. The process of molding hollow tubes of plastic material which is non-form-retaining but which is capable of being rendered form-retaining by a curing operation which comprises extruding a tubular sheath-mold of substantially solid material around a core of substantially solid material but spaced therefrom, substantially simultaneously extruding the plastic material into the space between the tubular sheath-mold and the core, tightly constricting the sheath-mold to the core at spaced points along its length to form a seal for the next succeeding section, severing the sheath-mold at the constricted points to obtain sealed lengths of plastic-filled sheath-mold, subjecting the plastic material in the severed portions to a curing operation, and subsequently removing substantially the whole of the sheath-mold and the core to obtain a form-retaining hollow tube of the cured plastic.

10. The process of molding plastic material which is non-form-retaining but which is capable of being rendered form-retaining by a curing operation to a desired shape and length which comprises extruding a tubular sheath-mold of a substantially solid material, substantially simultaneously extruding the plastic material into the extruded sheath-mold, thereby filling the sheath-mold as it is extruded, continuously passing the plastic-filled sheath-mold through a curing chamber to cure the plastic to a substantially form-retaining state, and subsequently removing substantially the whole of the sheath-mold from the solidified material.

11. The process of molding hollow tubes of solidifiable plastic material which comprises extruding a tubular sheath of a substantially solid material around a core of substantially solid material but spaced therefrom, substantially simultaneously extruding the solidifiable plastic material into the annular space between the sheath and core, thereby filling said space, continuously passing the plastic-filled sheath through a curing chamber, and subsequently removing the sheath and the core from the cured material.

12. The process of forming molded lengths of homogeneous solidified and cured phenol-formaldehyde condensation products of predetermined uniform shape with the constituent material thereof initially in a plastic state of substantially unpourable viscosity which comprises, extruding a pressure-flowable substance to form a continuous homogeneous sheath-mold of accurately predetermined uniform shape, substantially simultaneously therewith extruding the constituent material of the said product in a plastic state of substantially unpourable viscosity within the continuous sheath-mold, subsequently curing and solidifying the product within the sheath-mold, and thereafter removing substantially the whole of the sheath-mold.

13. The process of molding directly synthetic resins in a plastic state of substantially unpourable viscosity which comprises, extruding a ductile metal substance to form a continuous homogeneous sheath-mold of accurately predetermined uniform shape, substantially simultaneously therewith extruding the resin in a plastic state of substantially unpourable viscosity within the continuous sheath, subsequently solidifying the resin to a form-retaining state within the sheath, and thereafter removing substantially the whole of the sheath.

14. The process of molding directly solidifiable plastic material in a state of substantially unpourable viscosity to form lengths of a homogeneous solidified product thereof predetermined and uniform as to shape which comprises, extruding a ductile metal substance to form a continuous homogeneous sheath-mold of accurately predetermined uniform shape, sealing the sheath at its first extruded end portion, substantially simultaneously with the extrusion of the sheath and the sealing of the said end portion thereof extruding the plastic material in a state of substantially unpourable viscosity within the continuous sheath, sealing the sheath at another portion thereof along its length, repeating the said extruding operations, whereby a number of plastic-filled molds of desired length are obtained, subsequently solidifying the product to a form-retaining state within the sheath-molds, and thereafter removing substantially the whole of the sheaths.

15. The process of molding lengths of plastic material which is non-form-retaining but which is capable of being rendered form-retaining by a curing operation which comprises, extruding the plastic material into a sheath-mold of substantially solid material which serves as a mold therefor, said plastic material being initially extruded directly into one portion of said sheath-mold and subsequently extruded directly into succeeding portions of the sheath-mold as the preceding portions are filled with the plastic material, subsequently curing the plastic material to a substantially form-retaining state, and thereafter removing substantially the whole of the sheath-mold.

16. The process of molding substantially cylindrical lengths of plastic material which is non-form-retaining but which is capable of being rendered form-retaining by a curing operation which comprises extruding the plastic material into a substantially cylindrical sheath-mold of substantially solid material which serves as a mold for the plastic material, said plastic material being initially extruded directly into one portion of said sheath-mold and subsequently progressively and substantially continuously extruded directly into succeeding portions of the sheath-mold as the preceding portions are filled with the plastic material, subsequently curing the plastic material to a substantially form-retaining state, and thereafter removing substantially the whole of the sheath-mold.

17. The process of molding hollow tubes of plastic material which is non-form-retaining but which is capable of being rendered form-retaining by a curing operation which comprises, extruding the plastic material into the space between a core of substantially solid material and a sheath of substantially solid material encircling the core but spaced therefrom, said plastic material being initially extruded directly into one portion of said sheath and subsequently extruded directly into succeeding portions of the sheath as the preceding portions are filled with the plastic material, subsequently curing the plastic material and thereafter removing substantially the whole of the sheath.

18. The process of molding lengths of thermosetting plastics requiring form-retaining support during the curing operation which comprises, extruding a tubular sheath of a form-retaining metallic material to serve as a mold for the plastic, substantially simultaneously extruding the thermosetting plastic into the sheath, thereby wholly filling the sheath as it is extruded, curing the plastic while within the sheath to a substantially form-retaining state, and subsequently removing substantially the whole of the sheath from the plastic.

19. The process of molding thermosetting plastics requiring form-retaining support during the curing operation which comprises, extruding a tubular sheath-mold of a form-retaining metallic material to serve as a mold for the plastic, substantially simultaneously extruding the thermosetting plastic into the sheath-mold, thereby filling the sheath-mold as it is extruded, severing and sealing sections of the plastic-filled sheath-mold, curing the plastic while within the sheath-mold sections to a substantially form-retaining state, and subsequently removing substantially the whole of the sheath-mold from the plastic.

20. The process of molding plastic material which is non-form-retaining but which is capable of being rendered form-retaining by a curing operation which comprises extruding a tubular sheath of substantially solid material, substantially simultaneously extruding the plastic material into the extruded sheath, thereby filling the sheath with plastic material as it is extruded, curing the plastic material within the sheath, subsequently stripping substantially the whole of the sheath from the cured material, and thereafter using the removed sheath as material for forming a tubular sheath in a subsequent operation.

21. The process of forming lengths of a molding composition of predetermined uniform shape from a plastic material which is non-form-retaining but which is capable of being rendered form-retaining by a curing operation which comprises extruding a pressure-flowable substance to form a tube-mold of predetermined uniform shape, extruding within said tube-mold as it is extruded the molding composition while in its non-form-retaining state, the extrusion pressure being sufficient to mold the composition to the internal shape of the tube-mold, subsequently curing the molding composition within the tube-mold, thereafter removing substantially the whole of the tube-mold, and subsequently using the removed tube-mold as material for forming a tube-mold in a subsequent operation.

22. The process of forming molded lengths of a composition of predetermined uniform shape which comprises extruding a pressure-flowable substance to form a tube-mold of uniform shape to serve as a mold for the composition, extruding within said tube-mold as it is extruded a molding composition which is non-form-retaining but which is capable of being rendered form-retaining by a curing operation, the extrusion pressure being sufficient to mold the composition to the internal shape of the tube-mold, sealing and severing lengths of the filled tube-mold, subsequently curing the molding composition while within said lengths to a form-retaining state, and thereafter removing the tube-molds from said lengths.

23. The process of forming molded hollow tubes of predetermined uniform shape from plastic material which is non-form-retaining but which is capable of being rendered form-retaining, which comprises extruding a tube-mold of pressure-flowable substance around a core which is movable within the tube-mold as it is extruded, said core and tube-mold being adapted to serve as a mold for said plastic material, introducing the plastic material into the annular space between said core and tube-mold as the tube-mold is extruded, applying sufficient pressure to the plastic material within said tube-mold to mold the material to the internal shape of the tube-mold, subsequently curing the plastic material while between the core and tube-mold, and thereafter removing the core and substantially the whole of the tube-mold to obtain form-retaining hollow tubes of the cured plastic.

24. The process of molding synthetic resins initially in an extrudable condition which comprises extruding a tube-mold of an extrudable form-retaining material adapted to serve as a mold for said synthetic resins, extruding the synthetic resin into said tube-mold under a pressure sufficient to mold the resin to the internal shape of the tube-mold, subsequently curing the resin to a substantially solid state while within the tube-mold, and thereafter removing substantially the whole of the tube-mold to obtain solidified lengths of the resin.

25. The process of molding synthetic resins initially in an extrudable condition which comprises extruding a lead tube-mold of accurately predetermined uniform shape, extruding the synthetic resin into said tube-mold under a pressure sufficient to mold the resin to the internal shape of the tube-mold, subsequently curing the resin to a substantially solid state while within the tube-mold, and thereafter removing substantially the whole of the tube-mold to obtain solidified lengths of the resin.

26. The process of molding extrudable molding compositions capable of being rendered form-retaining by a curing operation, but requiring form-retaining support during said curing which comprises extruding a tube-mold of an extrudable form-retaining material adapted to serve as a mold for said molding compositions during curing, extruding the molding composition into said tube-mold under a pressure sufficient to mold the composition to the internal shape of the tube-mold, subsequently curing the composition to a substantially solid state while within the tube-mold, and thereafter removing substantially the whole of the tube-mold to obtain solidified lengths of the molding composition.

27. The process of molding synthetic resins initially in an extrudable condition which comprises extruding a lead tube-mold of accurately predetermined uniform shape, extruding the synthetic resin into said tube-mold under a pressure sufficient to mold the resin to the internal shape of the tube-mold, sealing and severing sections of the resin-filled tube-mold while the resin in the sections is under the extrusion pressure, subsequently curing the resin in the sections to a substantially solid state while within the tube-mold, and thereafter removing substantially the whole of the tube-mold to obtain solidified lengths of the resin.

CONRAD C. JACOBSON.